United States Patent
Burbaum et al.

(10) Patent No.: US 9,421,639 B2
(45) Date of Patent: Aug. 23, 2016

(54) COMPONENT HAVING WELD SEAM AND METHOD FOR PRODUCING A WELD SEAM

(71) Applicants: Bernd Burbaum, Falkensee (DE); Selim Mokadem, Nürnberg (DE); Norbert Pirch, Aachen (DE)

(72) Inventors: Bernd Burbaum, Falkensee (DE); Selim Mokadem, Nürnberg (DE); Norbert Pirch, Aachen (DE)

(73) Assignees: SIEMENS AKTIENGESELLSCHAFT, München (DE); FRAUNHOFER GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 490 days.

(21) Appl. No.: 13/945,214

(22) Filed: Jul. 18, 2013

(65) Prior Publication Data

US 2013/0299467 A1    Nov. 14, 2013

Related U.S. Application Data

(62) Division of application No. 12/988,334, filed as application No. PCT/EP2009/053511 on Mar. 25, 2009, now abandoned.

(30) Foreign Application Priority Data

Apr. 18, 2008   (DE) .................... 10 2008 019 636

(51) Int. Cl.
*B23K 26/24* (2014.01)
*B23K 26/32* (2014.01)
*B23P 6/04* (2006.01)
*F01D 5/00* (2006.01)

(52) U.S. Cl.
CPC ............... *B23K 26/32* (2013.01); *B23K 26/24* (2013.01); *B23K 26/342* (2015.10); *B23P 6/045* (2013.01); *F01D 5/005* (2013.01); *B23K 2203/08* (2013.01); *B23K 2203/50* (2015.10); *F05D 2230/232* (2013.01); *F05D 2300/175* (2013.01); *F05D 2300/176* (2013.01); *Y10T 428/12389* (2015.01)

(58) Field of Classification Search
CPC ....... B23K 26/34; B23K 26/342; B23K 26/24
USPC ..................... 219/121.61–121.64, 121.83
See application file for complete search history.

(56) References Cited

U.S. PATENT DOCUMENTS

| | | | | |
|---|---|---|---|---|
| 6,024,792 A * | 2/2000 | Kurz | ................ | B22F 3/1055 117/13 |
| 6,384,369 B1 * | 5/2002 | Stenersen | ............ | B01D 27/005 219/121.16 |
| 2004/0020907 A1 * | 2/2004 | Zauner | ................. | B23K 9/0953 219/130.21 |
| 2006/0213893 A1 * | 9/2006 | McGushion | ......... | B23K 9/0286 219/137 PS |
| 2006/0231535 A1 * | 10/2006 | Fuesting | ................ | B23P 6/007 219/121.64 |

* cited by examiner

Primary Examiner — Samuel M Heinrich

(57) ABSTRACT

During welding, frequently cracks develop at the end of the weld seam. A method is provided in which the power is reduced at the end of the weld seam, reducing the development of cracks. For the method, a welding appliance is used wherein the welding appliance may be a laser.

12 Claims, 5 Drawing Sheets

FIG 11

| Material | Chemical composition in % | | | | | | | | | | | | | |
|---|---|---|---|---|---|---|---|---|---|---|---|---|---|---|
| | C | Cr | Ni | Co | Mo | W | Ta | Nb | Al | Ti | B | Zr | Hf |
| Ni-based investment casting alloys | | | | | | | | | | | | | |
| GTD 222 | 0.10 | 22.5 | Rem. | 19.0 | | 2.0 | 1.0 | 1.0 | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

COMPONENT HAVING WELD SEAM AND METHOD FOR PRODUCING A WELD SEAM

CROSS REFERENCE TO RELATED APPLICATIONS

This application is a divisional of Ser. No. 12/988,334 filed on Oct. 18, 2010 which is the US National Stage of International Application No. PCT/EP2009/053511, filed Mar. 25, 2009 and claims the benefit thereof. The International Application claims the benefits of German application No. 10 2008 019 636.3 DE filed Apr. 18, 2008. All of the applications are incorporated by reference herein in their entirety.

FIELD OF INVENTION

The invention relates to a component having a weld seam and to a process for producing a weld seam.

BACKGROUND OF INVENTION

Welding processes are often used to remelt cracks or to apply material.

In this context, a defined power is used to melt the material.

However, in this case cracks can repeatedly appear in the region of the end of the weld seam and the substrate of the component.

SUMMARY OF INVENTION

It is therefore an object of the invention to avoid the formation of cracks.

The object is achieved by a component as claimed in the claims and by a process for producing a weld seam as claimed in the claims.

The dependent claims list advantageous measures which can be combined with one another, as desired, in order to obtain further advantages.

BRIEF DESCRIPTION OF THE DRAWINGS

FIG. 11 shows a list of superalloys.

The figures and the description represent only exemplary embodiments of the invention.

DETAILED DESCRIPTION OF INVENTION

Figure 1:
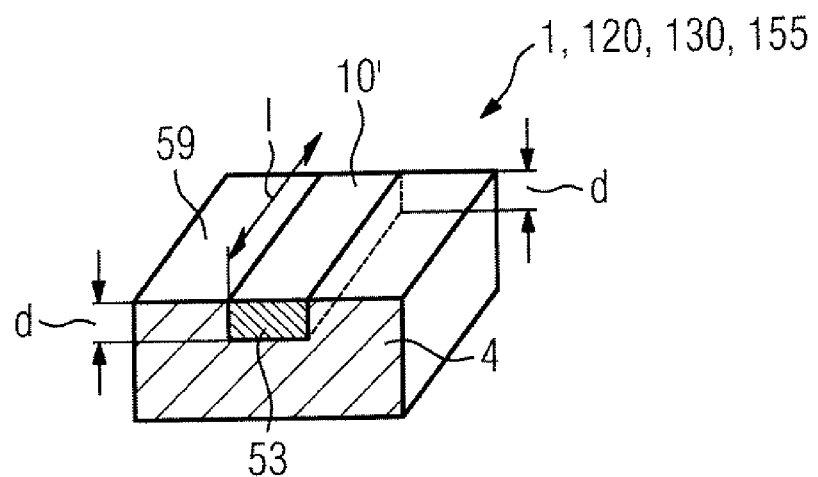
FIGS. 1, 2 show a weld seam according to the prior art.

FIG. 1 shows a cross section through a substrate 4 of a component 1, 120, 130, 155 (FIGS. 8, 9, 10) having a weld seam 10' according to the prior art.

The substrate 4 has a weld seam 10', which is defined by a length l and a thickness d. The length l is the longest extent of the weld seam 10, 10'.

Figure 2:
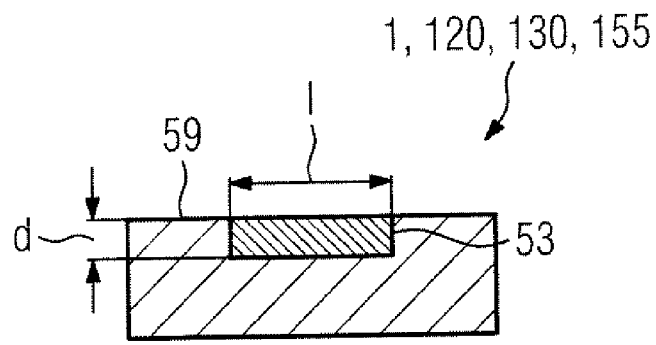

FIG. 2 shows a cross section along the length l of the weld seam 10' from FIG. 1.

The weld seam 10' is rectangular in this cross section. Cracks often arise in particular in the region at the end 53 of the weld seam 10 and the unwelded region of the substrate 4.

Figure 3:
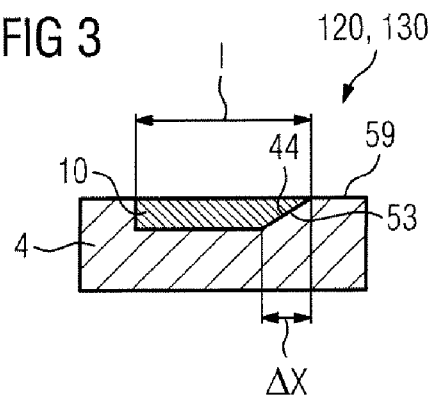
FIGS. 3, 4, 5 show a weld seam of a component.

FIG. 3 shows a weld seam 10 according to the invention.

Particularly in the case of components 1, 120, 130, 155 for gas turbines 100 (FIG. 8) or steam turbines, the substrate 4 has a superalloy according to FIG. 11.

The substrate 4 of the component 1, 120, 130 has a directionally solidified structure, i.e. a single-crystal structure (SX), or has columnar grains (DS).

The thickness of the weld seam 10 tapers at the end 53 of the weld seam 10. At the end 53 of the weld seam 10, the weld seam 10 thus extends in the form of a, preferably curved, ramp 44, where the weld seam 10 likewise has a directionally solidified structure (DS, SX), in particular without misorientations. In this case, the orientation of the directionally solidified structure (DS, SX) of the weld seam 10 is preferably the same as that of the directionally solidified structure (DS, SX) of the substrate 4.

The weld seam 10 preferably has the same material as the substrate 4. This is the case for laser remelting. If material has been added for the weld seam 10, the material of the weld seam 10 may be different.

In the direction of the length l, the ramp 44 has a length $\Delta X$ which is considerably smaller than the overall length l of the weld seam 10: $\Delta X < l$, in particular $\Delta X/l \leq 33\%$, very particularly $\leq 25\%$. $\Delta X$ is preferably 3 mm-7 mm, in particular 5 mm. This is preferably independent of the length l of the weld seam 10.

The ramp 44 can extend up to the surface 59 (FIGS. 3, 4) or can remain underneath (FIG. 5) the surface 59, and therefore there is a depth d' (d'<d) with a profile perpendicular to the surface 59.

Figure 4:
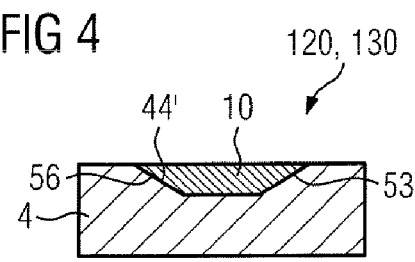
Figure 5:
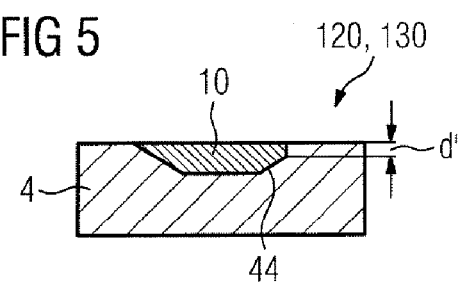

A ramp 44' can likewise be produced at the start 56 of the weld seam 10 (FIGS. 4, 5). The statements made in relation to the ramp 44 similarly apply to the ramp 44'.

Figure 6:
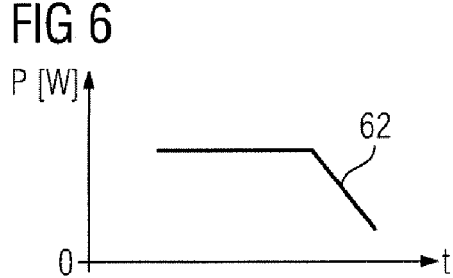
FIGS. 6, 7 show the profile of a laser power P.
Figure 7:
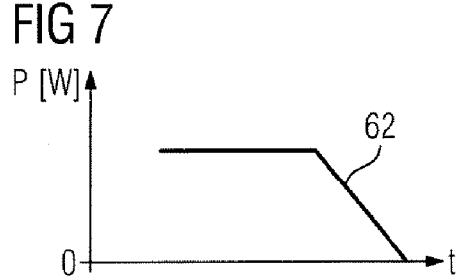

The ramp-shaped profile 44, 44' of the weld seam 10 at the end 53, 56 of the weld seam 10 is achieved in that the power P of the welding appliance is reduced at a distance $\Delta X$ before the end 53 of the weld seam 10 or over a length $\Delta X$ and likewise has a ramp-shaped profile 62 (FIGS. 6, 7). The value for $\Delta X$ is preferably 5 mm.

A relative movement between the substrate 4 and the welding appliance or laser also takes place during the reduction of the laser power—explained with preference for a welding appliance.

The melt front thus remains further in forward motion even though the melt depth is continuously reduced. The desired solidification conditions (SX, DS) can thus be maintained up to the end 53, 56 of the weld seam 10, resulting in an end 53, 56 of the weld seam 10 which is free from defects. The travel speed (relative speed) during the production of the ramp 44, 44' preferably remains constant.

The power P is preferably reduced to 0 at the end 53 of the weld seam 10 (FIG. 7). In this case, the distance $\Delta X$ corresponds to a defined time of a travel time of the substrate 4 and the welding appliance in relation to one another, which is preferably between 4 s and 8 s, very preferably 6 s. The power of the welding appliance or of the laser is preferably reduced linearly (or increased linearly at the start).

The laser power and the travel speed are set such that the magnitude (depth) of the melt is continuously reduced, but such that the melt front is maintained, notwithstanding a reduced melt rate.

In respect of the ramp 44' at the start of the weld seam 10, it preferably similarly applies that the power P of the welding appliance is increased from 0 W.

The laser power and the other parameters are set such that a directionally solidified structure (SX, DS) is achieved in the weld seam 10, which preferably has the same structure (SX, DS) as the substrate.

The number of cracks at the end 53, 56 of the weld seam 10 is therefore reduced considerably, or cracks are avoided.

A preheating temperature of the substrate 4 is preferably 400° C. to 600° C., very preferably 500° C., and this is preferably controlled during the process.

The power of the laser is preferably 400 W to 600 W, very preferably 500 W, where the diameter of the laser beam is preferably 4 mm.

The travel speed is preferably 40 mm/min-60 mm/min, in particular 50 mm/min.

Figure 8:
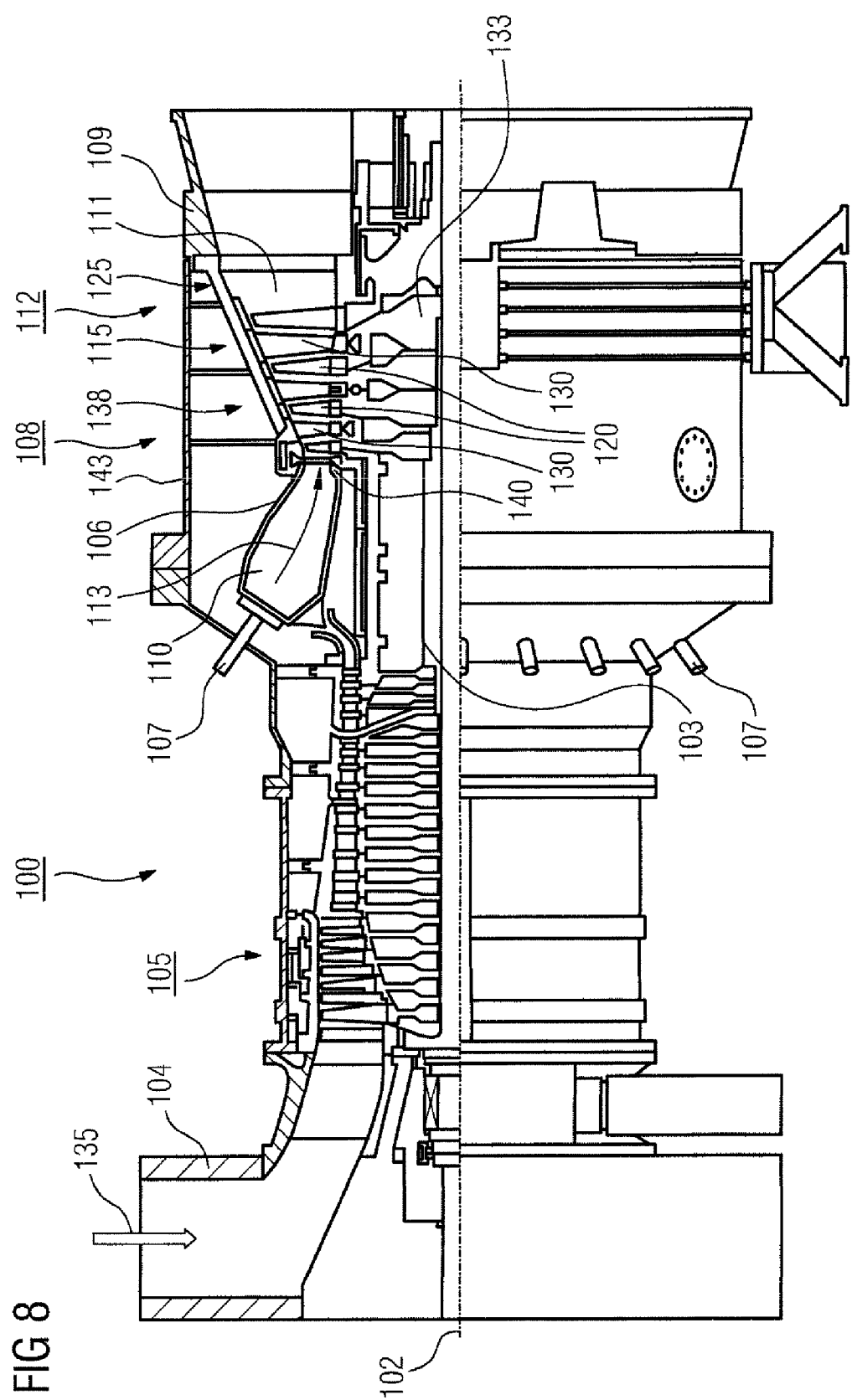
FIG. 8 shows a gas turbine.

FIG. 8 shows, by way of example, a partial longitudinal section through a gas turbine 100.

In the interior, the gas turbine 100 has a rotor 103 with a shaft which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 9:
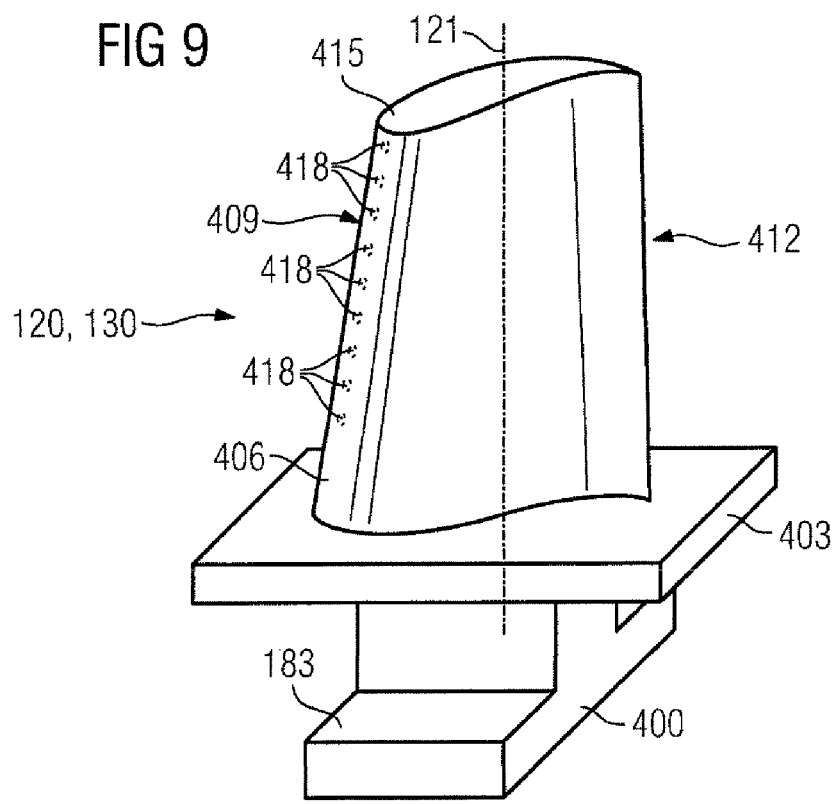
FIG. 9 shows a perspective view of a turbine blade or vane.

FIG. 9 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure with regard to the solidification process.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of this disclosure with regard to the chemical composition of the alloy.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

The blade or vane 120, 130 may be hollow or solid in form. If the blade or vane 120, 130 is to be cooled, it is hollow and may also have film-cooling holes 418 (indicated by dashed lines).

Figure 10:
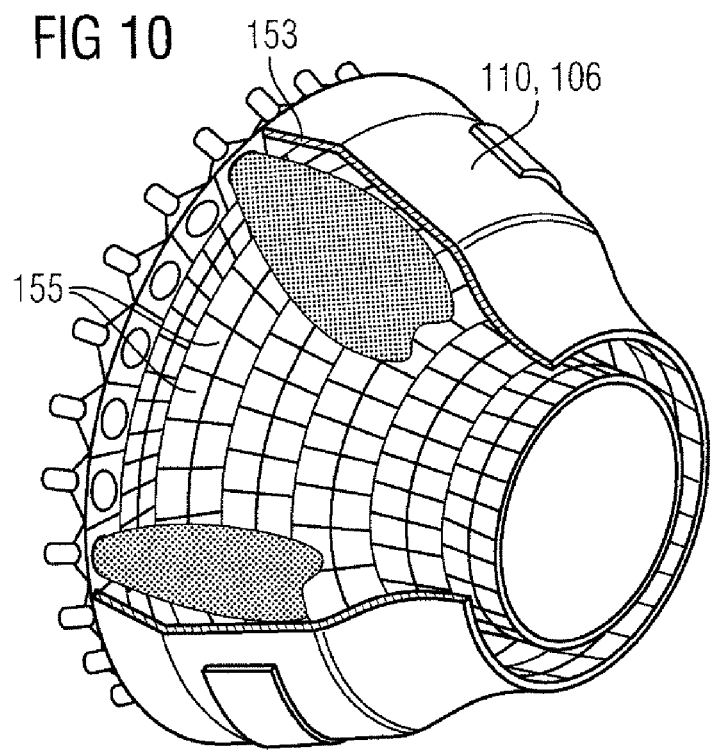
FIG. 10 shows a perspective view of a combustion chamber.

FIG. 10 shows a combustion chamber 110 of the gas turbine 100. The combustion chamber 110 is configured, for example, as what is known as an annular combustion chamber, in which a multiplicity of burners 107, which generate flames 156, arranged circumferentially around an axis of rotation 102 open out into a common combustion chamber space 154.

For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1, which are intended to form part of this disclosure with regard to the chemical composition of the alloy.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from turbine blades or vanes 120, 130 or heat shield elements 155 (e.g. by sandblasting). Then, the corrosion and/or oxidation layers and products are removed. If appropriate, cracks in the turbine blade or vane 120, 130 or in the heat shield element 155 are also repaired. This is followed by recoating of the turbine blades or vanes 120, 130 or heat shield elements 155, after which the turbine blades or vanes 120, 130 or the heat shield elements 155 can be reused.

We claim:

1. A method for producing a weld seam with a length in a component, comprising:
    using a welding appliance; and
    reducing a power of the welding appliance over a defined ramp length such that an end of a weld seam is formed with a ramp shape over the defined ramp length,
    and
    wherein the component comprises:
        a weld seam,
            wherein the weld seam extends at one end of the weld seam at least partially in a form of a ramp,
            wherein the weld seam has a directionally solidified structure without misorientations,
            wherein the weld seam includes a length,
            wherein the ramp includes a ramp length in a direction of the length of the weld seam, and
            wherein the ramp length is smaller than the length of the weld seam.

2. The method as claimed in claim 1, wherein the welding appliance used is a laser.

3. The method as claimed in claim 1, wherein the power of the welding appliance is reduced to 0 watt at one end of the weld seam.

4. The method as claimed in claim 1, wherein the power of the welding appliance is not reduced to 0 watt at the end of the weld seam.

5. The method as claimed in claim 1, wherein the power of the welding appliance is reduced at the end of the weld seam within 4 s to 8 s.

6. The method as claimed in claim 1, wherein a preheating temperature of the substrate is controlled and/or regulated.

7. The method as claimed in claim 1, wherein a travel speed during a ramp formation is 40 mm/min-60 mm/min.

8. The method as claimed in claim 1, wherein the power of the welding appliance is increased over the defined ramp length, where the ramp length is less than the length of the weld seam, at the start of the weld seam.

9. The method as claimed in claim 1, wherein the power of the welding appliance is increased or decreased linearly during the production of the ramp.

10. The method as claimed in claim 1, wherein the substrate of the component includes a directionally solidified structure.

11. The method as claimed in claim 1, wherein a melt front produced by the welding appliance remains further in forward motion up to the end of the weld seam or until the welding appliance is switched off.

12. The method as claimed in claim 1, wherein the relative movement between the substrate and the welding appliance is maintained until the welding appliance is switched off.

* * * * *